US012445290B2

(12) United States Patent
Manamohan et al.

(10) Patent No.: US 12,445,290 B2
(45) Date of Patent: Oct. 14, 2025

(54) DETECTING AND DEFENDING AGAINST ADVERSARIAL ATTACKS IN DECENTRALIZED MACHINE LEARNING SYSTEMS

(71) Applicant: HEWLETT PACKARD ENTERPRISE DEVELOPMENT LP, Spring, TX (US)

(72) Inventors: Sathyanarayanan Manamohan, Bangalore (IN); Cynara Justine, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 95 days.

(21) Appl. No.: 18/459,891

(22) Filed: Sep. 1, 2023

(65) Prior Publication Data
US 2024/0259208 A1    Aug. 1, 2024

(30) Foreign Application Priority Data
Jan. 31, 2023    (IN) .............................. 202341006255

(51) Int. Cl.
*H04L 9/32*    (2006.01)
*G06N 20/00*    (2019.01)

(52) U.S. Cl.
CPC ........... *H04L 9/3236* (2013.01); *G06N 20/00* (2019.01); *H04L 2209/463* (2013.01)

(58) Field of Classification Search
CPC .. G06N 20/00; H04L 9/3236; H04L 2209/463
See application file for complete search history.

(56) References Cited

U.S. PATENT DOCUMENTS 9,729,562 B2    8/2017    Sonnenberg et al.
11,050,770 B2    6/2021    Nanda et al.
(Continued)

FOREIGN PATENT DOCUMENTS

CN    116484707 A  *  7/2023
CN    116595094 A  *  8/2023
(Continued)

OTHER PUBLICATIONS

Borgnia et al., "DP-InstaHide: Provably Defusing Poisoning and Backdoor Attacks with Differentially Private Data Augmentations", 2021, 11 pages.
(Continued)

*Primary Examiner* — Jonathan A Bui
(74) *Attorney, Agent, or Firm* — Hewlett Packard Enterprise Patent Department (57) ABSTRACT

A system and a method for detecting and defending against adversarial attacks in decentralized learning models are described. The method comprises obtaining a learning parameter for determining a reference cryptographic hash value and a similarity between the data processing nodes (102). A cryptographic hash value is determined for each data processing node (102) based on the learning parameter. The trust score of each data processing node (102) is updated based on matching of the cryptographic hash value with the reference cryptographic hash value. The learning parameter of each data processing node (102) is merged to obtain a merged learning parameter based on the trust score. The merged learning parameter is provided to the data processing nodes (102) to be used for training the machine learning models.

20 Claims, 5 Drawing Sheets

(56) References Cited

U.S. PATENT DOCUMENTS

| | | | |
|---|---|---|---|
| 11,252,188 B1 | 2/2022 | Lantuh et al. | |
| 11,748,835 B2* | 9/2023 | Manamohan | H04L 9/3239 |
| | | | 705/51 |
| 2021/0012188 A1 | 1/2021 | Zhang et al. | |
| 2021/0157911 A1 | 5/2021 | Yu | |
| 2021/0192357 A1 | 6/2021 | Sinha et al. | |
| 2021/0224425 A1 | 7/2021 | Nasr-Azadani et al. | |
| 2021/0234668 A1* | 7/2021 | Manamohan | H04L 9/0825 |
| 2021/0406364 A1 | 12/2021 | Dasgupta et al. | |
| 2022/0075061 A1 | 3/2022 | Husain | |
| 2022/0085975 A1* | 3/2022 | Manamohan | G06F 21/64 |
| 2022/0156368 A1* | 5/2022 | Spyridopoulos | G06N 3/08 |
| 2022/0229936 A1* | 7/2022 | Sohail | G06F 16/2379 |
| 2023/0214925 A1* | 7/2023 | Cella | G06Q 30/06 |
| | | | 705/37 |

FOREIGN PATENT DOCUMENTS

| | | | | |
|---|---|---|---|---|
| CN | 114707663 B | * | 2/2024 | G06N 20/00 |
| CN | 118396080 A | * | 7/2024 | |
| DE | 102018111685 A1 | * | 11/2018 | G06F 3/011 |
| TW | 202411896 A | * | 3/2024 | |
| WO | 2022/043010 A1 | | 3/2022 | |
| WO | WO-2023201236 A1 | * | 10/2023 | G06F 21/6245 |

OTHER PUBLICATIONS

Bowman et al., "Comparing Speed Reduction of Adversarial Defense Systems on Deep Neural Networks", IEEE Instrumentation and Measurement Society prior to the acceptance and publication, 2021, 5 pages.

Camerero-Cano et al., "Regularization Can Help Mitigate Poisoning Attacks . . . with the Right Hyperparameters", 2021, 10 pages.

Chen et al., "De-Pois: An Attack-Agnostic Defense against Data Poisoning Attacks", IEEE Transactions on Information Forensics and Security, 2021, 14 pages.

Evani et al., "Data Poisoning Won't Save You From Facial Recognition", ICLR, 2022, 20 pages.

Fowl et al., "Adversarial Examples Make Strong Poisons", Jun. 21, 2021, 17 pages.

Geiping et al., "What Doesn't Kill You Makes You Robust(er): How to Adversarially Train against Data Poisoning", 2022, 25 pages.

Goldblum et al., "Dataset Security for Machine Learning: Data Poisoning, Backdoor Attacks, and Defenses", Mar. 2021, 39 pages.

Henry Daniel, Countermeasures Against Backdoor, Data Poisoning, and Adversarial Attacks, 2021, 24 pages.

Jebreel et al., "FL-Defender: Combating Targeted Attacks in Federated Learning", 2022, 17 pages.

Jia et al., "Certified Robustness of Nearest Neighbors against Data Poisoning and Backdoor Attacks", 2021, 19 pages.

Jia et al., "Intrinsic Certified Robustness of Bagging against Data Poisoning Attacks", 2020, 23 pages.

Kasichainula et al., "Poisoning Attacks via Generative Adversarial Text to Image Synthesis", 51st Annual IEEE/IFIP International Conference on Dependable Systems and Networks Workshops (DSN-W) 978-1-, 2021, 8 pages.

Levine et al., "Deep Partition Aggregation: Provable Defense against General Poisoning Attacks", ICLR, 2021, 20 pages.

Levine et al., "Provable Adversarial Robustness for Fractional Lp Threat Models", Mar. 16, 2022, 35 pages.

Li et al., "SoK: Certified Robustness for Deep Neural Networks", Apr. 12, 2023, 23 pages.

Lin et al., "ML Attack Models: Adversarial Attacks and Data Poisoning Attacks", 2021, 30 pages.

Moayeri et al., "Sample Efficient Detection and Classification of Adversarial Attacks via Self-Supervised Embeddings", 2021, 10 pages.

Peri et al., "Deep k-NN Defense Against Clean-label Data Poisoning Attacks", Aug. 13, 2020, 16 pages.

Quiring et al., "Backdooring and Poisoning Neural Networks with Image-Scaling Attacks", Mar. 2020, 7 pages.

Seetharaman et al., "Influence Based Defense Against Data Poisoning Attacks in Online Learning", 2021, 18 pages.

Tan et al., "Bypassing Backdoor Detection Algorithms in Deep Learning", 2020, 9 pages.

Tao et al., "Better Safe Than Sorry: Preventing Delusive Adversaries with Adversarial Training", Dec. 13, 2021, 29 pages.

Wang et al., "Improved Certified Defenses against Data Poisoning with (Deterministic) Finite Aggregation", 2022, 15 pages.

Weerasinghe et al., "Defending Support Vector Machines Against Data Poisoning Attacks", IEEE Transactions on Information Forensics and Security, vol. 16, 2021, 13 pages.

Zhao et al., "Detecting and mitigating poisoning attacks in federated learning using generative adversarial networks", WILEY, 2020, 12 pages.

Oakley, T., "Coca-Cola: Ansoff Matrix," Mar. 28, 2015, https://themarketingagenda.com/2015/03/28/coca-cola-ansoff-matrix/.

* cited by examiner

DETECTING AND DEFENDING AGAINST ADVERSARIAL ATTACKS IN DECENTRALIZED MACHINE LEARNING SYSTEMS

BACKGROUND

Machine Learning (ML) techniques are known to utilize algorithms and statistical models for performing specific tasks. ML models are trained to produce output based on their learning developed from training data. Because quantity of training data required to develop such ML models is vast, enormous processing capability is required for development of the ML models.

To reduce the processing burden on a single data processing node, instances of an ML model are developed through decentralized learning, such as through federated learning. Decentralized learning involves collectively training an ML model upon local data present at different sites. That is, multiple instances of the ML model are locally trained on local data present at each data processing node, and states (weights/biases), also called learning parameters, are provided to a leader node. The leader node merges such parameters and redistributes a merged parameter to each data processing node.

The merged parameter is utilized by each instance of the ML model to continue their learning.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles of the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION OF THE INVENTION

Adversarial attacks are malicious attacks occurring mainly on training data and affect learning of Machine Learning (ML) models. In an adversarial attack, an adversary injects malicious data into a training pool of the ML models, to cause erroneous learning. A common result of the adversarial attack is that boundaries of the ML models shift in other direction. The adversarial attack also targets availability and integrity of the ML models. For example, in case of untargeted poisoning attacks, poisoned local model updates are injected into a system to deteriorate learning parameters utilized for development of a global ML model. In such attacks, an attacker impacts weights of the global ML model such that a newly learned model would never converge, thus affecting availability of the newly learned model during training time. The adversarial attack may be of different types, such as a backdoor attack, a poisoning attack, a red herring attack, a boiling frog attack, an exploratory attack, a clean label attack, a trigger-less attack, an untargeted attack, an evasion attack, and a training-only attack.

The adversarial attacks are a growing threat for deep learning systems, especially for federated learning systems as such attacks can be initiated from any participating node of a federated learning system.

One conventional approach utilizes a Federated Learning (FL) defender for detection and defense against the adversarial attacks. The FL defender is a software component of a data processing node which prevents an adversarial attack by mitigating an impact of malicious updates on a global model. The FL defender maintains a global model performance of a main task by determining similarity amongst last-layer gradients.

The FL defender implements a central parameter aggregator for detection and defense against the adversarial attacks. Operation of the central parameter aggregator is assumed to be genuine. Such an assumption creates a Single Point Of Failure (SPOF) and an easy target for attackers to compromise a federated learning system. Further, such conventional approach lacks in building a robust system for isolating a malicious node to protect other nodes of the federated learning system. In addition, such conventional approach requires incorporation of detection and defense from attacks within methods used for development of ML models.

In other conventional approaches, the attacks are detected and defended based on evaluation metrics, clustering updates, worker behavior, update aggregation, and differential privacy. However, a prominent shortcoming of such approaches is the assumption that the central aggregator is genuine.

To address the above-mentioned shortcomings, present disclosure provides a decentralized ML system implemented on a blockchain network. The decentralized ML system includes multiple data processing nodes, each training an ML model. Each data processing node provides a learning parameter associated with respective ML model, to all other data processing nodes, for storage in a distributed ledger. A copy of the distributed ledger is present with each of the data processing nodes. A leader node elected from the data processing nodes generates a merged learning parameter. The merged learning parameter may be utilized by each data processing node to continue training of respective ML model. To secure the decentralized ML system, malicious data processing nodes are required to be identified.

For identification of the malicious data processing nodes, each data processing node determines a similarity between learnings of the data processing nodes. A value of the similarity and a reference cryptographic hash value may be published on the distributed ledger.

The reference cryptographic hash value and the value of the similarity may be utilized by the leader node to determine trust scores of other data processing nodes. The leader node may update a node weightage of each of the data processing nodes based on a trust score of respective data processing node. A low value of node weightage of a data processing node indicates its malicious nature. The node weightage of each processing node is updated after each iteration of learning of the ML models. In this manner, the node weightage of a malicious data processing node may decrease and fall below a predefined threshold value. Thereafter, the malicious data processing node is excluded from learning performed by the decentralized ML system.

Figure 1:
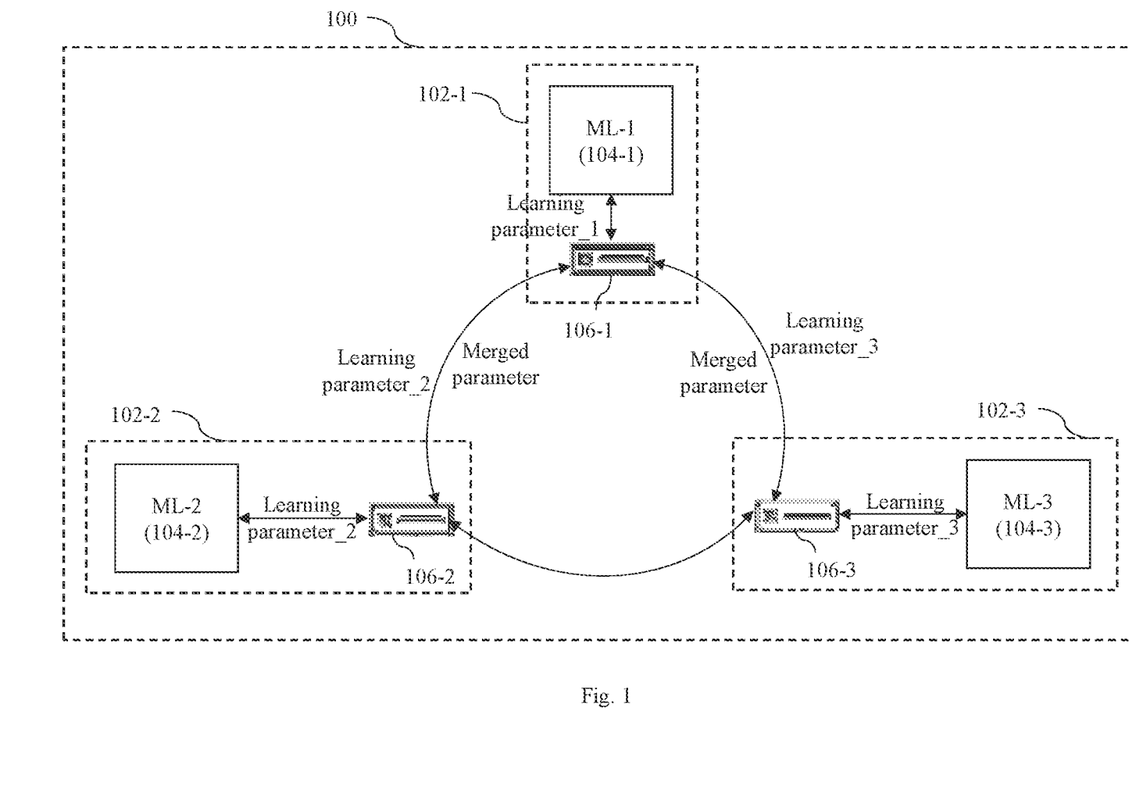
FIG. 1 illustrates a network architecture of a blockchain network for detecting and defending decentralized Machine Learning (ML) models against an adversarial attack, in accordance with an embodiment of the present disclosure.

FIG. 1 illustrates a network architecture of a blockchain network 100 for detecting and defending decentralized Machine Learning (ML) models against an adversarial attack, in accordance with an embodiment of the present disclosure. The blockchain network 100 comprises a plurality of data processing nodes 102-1, 102-2, 102-3 connected with each other through a computer network, for training a ML model in a decentralized manner. Alternatively or additionally, the plurality of data processing nodes 102-1, 102-2, 102-3 may be referred as data processing nodes 102. For ease of illustration and explanation, only three data processing nodes are illustrated, but it must be understood that a typical decentralized machine learning system would comprise several such data processing nodes.

Although FIG. 1 illustrates the data processing nodes 102 being connected with each other in a ring topology, it is fairly possible to utilize different topologies for establishing communication between the data processing nodes 102. Other topologies for establishing connection between the data processing nodes 102 may include a mesh topology and a star topology.

Over the blockchain network 100, each of the data processing nodes 102 may be responsible to train an ML model over respective dataset. Further, each of the data processing nodes 102 may comprise a Swarm Learning Container (SLC). The SLC may be a proprietary and secured container which provides an environment for executing application of the data processing nodes 102. The SLC may comprise several plugins for performing various operations, such as federated averaging and parameter merging. As illustrated in FIG. 1, a first data processing node 102-1 may comprise a first instance of the ML model (ML-1) 104-1 and a first SLC (SLC-1) 106-1. ML-1 104-1 may determine learning parameters_1 and the SLC-1 106-1 may share the learning parameters_1 to other data processing nodes 102-2 and 102-3. Similarly, a second data processing node 102-2 may comprise a second instance of the ML model (ML-2) 104-2 and a second SLC (SLC-2) 106-2 for determining and sharing learning parameters_2 and a third data processing node 102-2 may comprise a third instance of the ML model (ML-3) 104-3 and a third SLC (SLC-3) 106-3 for determining and sharing learning parameters_3. Alternatively or additionally, the learning parameters_1, the learning parameters_2, and the learning parameters_3 may be referred as learning parameters.

The containers SLC-1 106-1, SLC-2 106-2, SLC-3 106-3 may share the learning parameters over the blockchain network 100 for training of the ML model, such as ML-1 104-1, ML-2 104-2, ML-3 104-3. Other components of the data processing node 102 are described in details henceforth.

Figure 2:
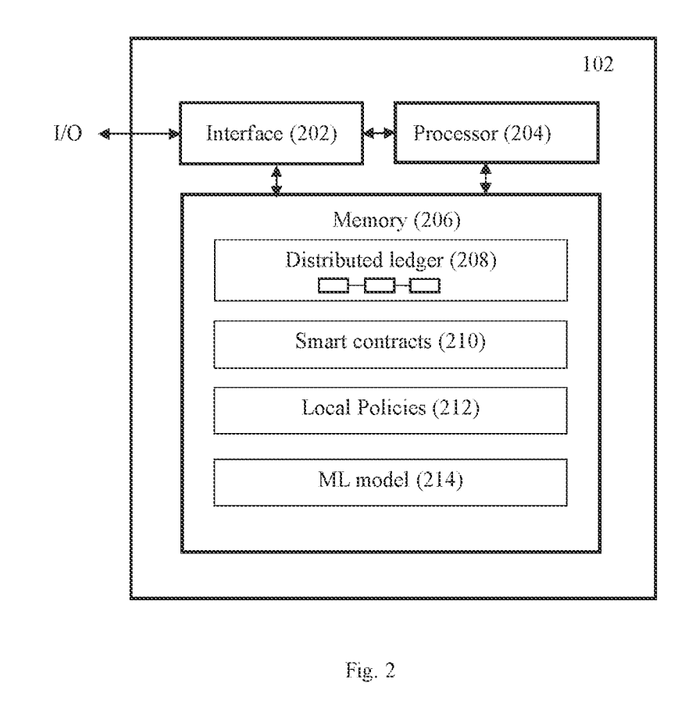
FIG. 2 illustrates a block diagram showing different components present in a data processing node of the blockchain network, in accordance with an embodiment of the present disclosure.

FIG. 2 illustrates a block diagram showing different components present in the data processing node 102, in accordance with an embodiment of the present disclosure. The data processing node 102 may comprise an interface 202, a processor 204, and a memory 206. The memory 206 may store a copy of a distributed ledger 208 of the blockchain network 100. The distributed ledger 208 may include a series of blocks of data that references at least one another block, such as a previous block in a chain of blocks. The blocks may store a blockchain transaction performed on the blockchain network 100. The copy of the distributed ledger 208 may be updated whenever a blockchain transaction is performed in the blockchain network 100.

The memory 206 may further store smart contracts 210. The smart contracts 210 may include a set of rules for configuring the data processing node 102 to behave in certain ways in relation to the blockchain network 100. The smart contracts 212 may be triggered and executed by an event performed on the blockchain network 100. In the event of trigger, the data processing node 102 may follow the set of rules specified by the smart contracts 212. For example, the set of rules may specify transferring the learning parameters to the blockchain network 100 and updating the learning parameters in the blockchain network 100.

In one implementation, the smart contracts 212 may also comprise rules on how to elect a leader node among the data processing nodes 102, how to perform merging of the learning parameters, when to initiate an iteration of machine learning, a number of data processing nodes required to agree to a consensus decision for electing the leader node, a percentage of voting nodes required to agree to a consensus decision, and/or other actions that the data processing nodes 102 may take for securing the blockchain network 100.

In addition, the memory 206 may further store local policies 212 to ensure that the data processing node 102 complies with the one or more operations, such as training and testing of the ML-1 108. The local policies 212 may be encoded by the smart contracts 210. The local policies may not be shared with other data processing nodes 102. In other words, the local policies 212 may be defined specifically for a data processing node at which it is stored.

The processor 204 may process user data received from one or more peripheral devices connected with the data processing node 102 via the interface 202. The peripheral devices may provide training data to the data processing node 102 and may receive model outcome from the data processing node 102. The training data may be utilized to train a ML model 214. The ML model 214 may provide the model outcome based on the training. The user data may only be accessible to the data processing node 102 locally and not to other nodes on the blockchain network 100.

The ML model 214 may be developed using a suitable algorithm, such as a Neural Network (NN), a Recurrent Neural Network (RNN), a Convolution Neural Network (CNN), and a Graph Neural Network (GNN). The ML-model 214 may be then fine-tuned based on the merged learning parameters shared by the data processing nodes 102. It must be understood that in decentralized learning, each data processing node may process local training data for training of a common ML model without sharing local training data to any other data processing node or entity in the blockchain network 100. This is accomplished by sharing learning parameters (weights) derived from training the common ML model using the local training data. In this way, the learned insights regarding raw data (instead of the raw data itself) may be shared amongst participants or collaborating peers nodes, which aids in protecting data against privacy breaches. Moreover, decentralized learning as described herein leverages blockchain technology to allow for decentralized control, monetization, and ensuring trust and security amongst individual nodes. Detailed functioning of such modules for identifying and discarding a malicious node from the decentralized ML system will become evident upon reading the details provided successively with reference to FIGS. 3A and 3B.

Figure 3A:
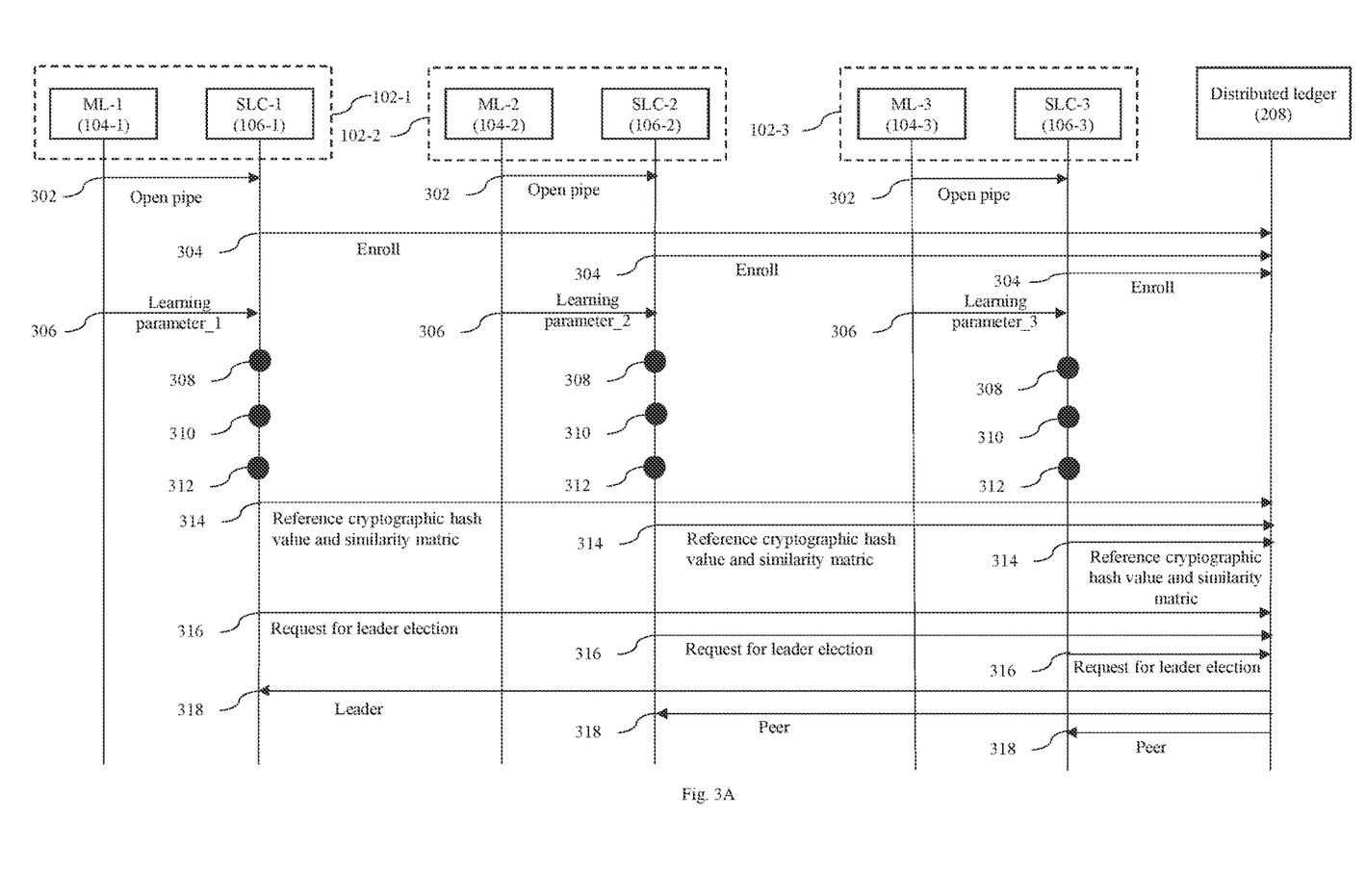
FIGS. 3A and 3B cumulatively illustrate a data flow diagram for detecting and defending decentralized ML models against an adversarial attack, in accordance with an embodiment of present invention.
Figure 3B:
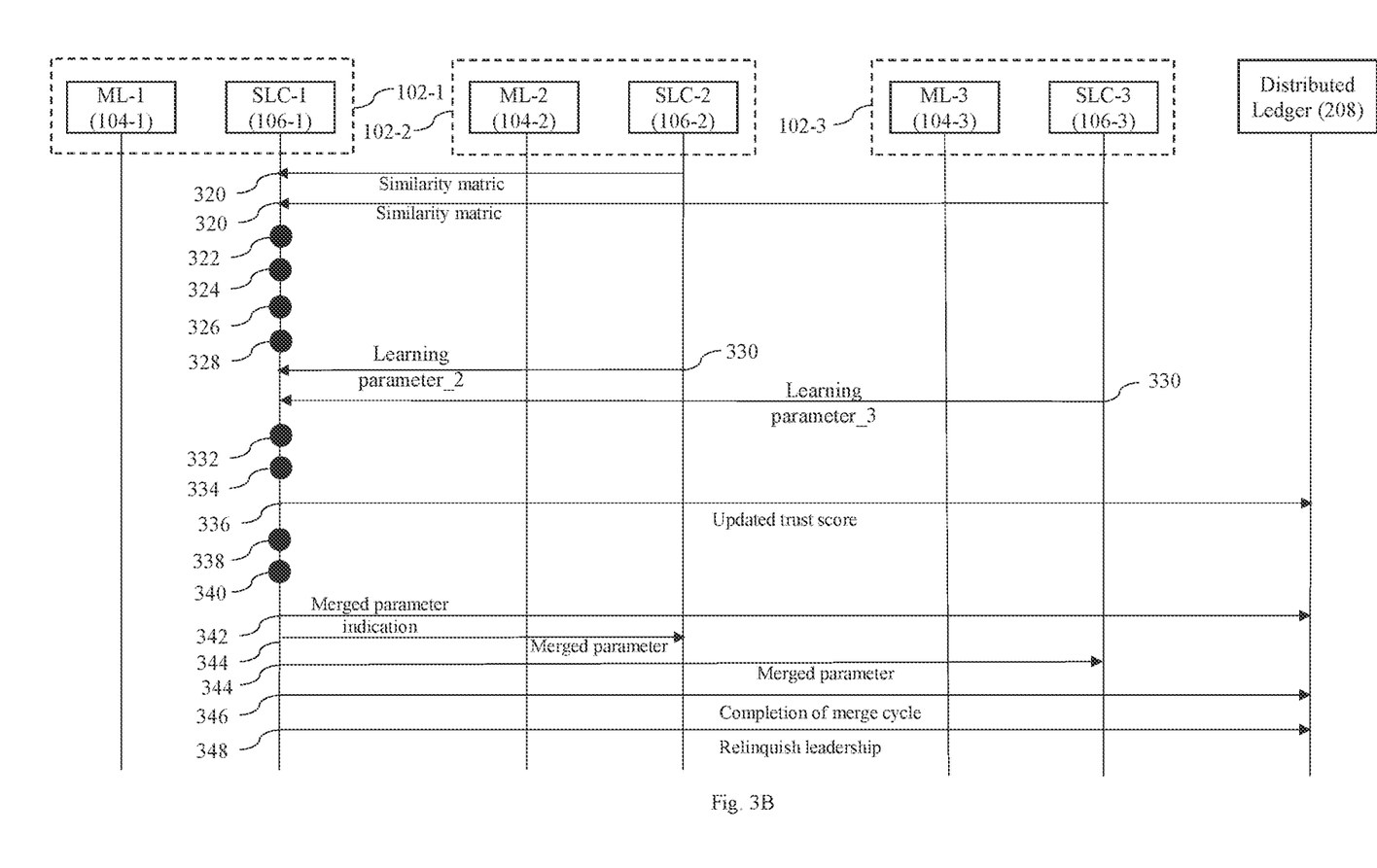

FIGS. 3A and 3B cumulatively illustrate a data flow diagram for detecting and defending decentralized ML models against an adversarial attack, in accordance with an embodiment of present disclosure. A connection may be established between a ML model and a SLC through a dedicated pipeline within each data processing node, at instance 302. For example, a connection may be established between a ML-1 104-1 and a SLC-1 106-1 within the first data processing node 102-1, a connection may be established between a ML-2 104-2 and a SLC-2 106-2 within the second data processing node 102-2, and a connection may be established between a ML-3 104-3 and a SLC-3 106-3 within the third data processing node 102-3.

Each of the containers SLC-1 106-1, SLC-2 106-2, SLC-3 106-3 may send a request to the distributed ledger 208 for their enrolment in the blockchain network 100, at instance 304. The blockchain network 100 may store a SL contract defining a set of rules for data processing nodes 102. The SL contract may be stored in the smart contracts of the data processing nodes 102. Each of the containers SLC-1 106-1, SLC-2 106-2, SLC-3 106-3 may be compliant with the SL contract. The containers SLC-1 106-1, SLC-2 106-2, SLC-3 106-3 may extract the learning parameters from their respective ML model, at instance 306. For example, the SLC-1 106-1 may extract the learning parameter_1 from the ML-1 104-1, the SLC-2 106-2 may extract the learning parameter_2 from the ML-2 104-2, and the SLC-3 106-3 may extract the learning parameter_3 from the ML-3 104-3.

Based on their respective learning parameters, the containers SLC-1 106-1, SLC-2 106-2, SLC-3 106-3 may determine a reference cryptographic hash value for their respective data processing node 102, at instance 308. For example, the SLC-1 106-1 may determine a first reference cryptographic hash value for the first data processing node 102-1. Similarly, the SLC-2 106-2 may determine a second reference cryptographic hash value for the second data processing node 102-2 and the SLC-3 106-3 may determine a third reference cryptographic hash value for the third data processing node 102-3. The reference cryptographic hash value refers an identity of a previous data processing node.

In one implementation, the containers SLC-1 106-1, SLC-2 106-2, SLC-3 106-3 may 3 may determine similarity between learnings of the plurality of machine learning models. In one implementation, the similarity may be determined in form of a similarity metric. The similarity may be determined using top layer gradients of similarity values associated with the ML-1 104-1, the ML-2 104-2, and the ML-3 104-3 respectively. The containers SLC-1 106-1, SLC-2 106-2, SLC-3 106-3 may extract top layers of a statistical model used for generating their respective reference cryptographic hash value, at instance 310. For determining the similarity, gradients of loss function of the top layers of the reference cryptographic hash value may be determined individually by each of the data processing nodes 102. The similarity may be determined in terms of values of cosine similarity between a centroid of the gradients and two principal components of the top layers. The similarity may be determined in a decentralized manner individually by each of the data processing nodes 102. For example, the SLC-1 106-1 may determine a first similarity associated with the first data processing node 102-1. Similarly, the SLC-2 106-2 may determine a second similarity associated with the second data processing node 102-2, and the SLC-3 106-3 may determine a third similarity associated with the third data processing node 102-3. The similarity may be determined to capture discrepancy between the gradients amongst the data processing nodes 102. The discrepancy may be caused by contradicting objectives of genuine data processing nodes and malicious data processing nodes amongst the data processing nodes 102.

The containers SLC-1 106-1, SLC-2 106-2, SLC-3 106-3 may compress the cosine similarity into a subspace with lower dimensions to generate a compressed similarity, at instance 312. The cosine similarity may be compressed using Principal Components Analysis (PCA). The PCA with two principal components may be used to generate the compressed similarity. Centroid of the compressed similarity may then be determined. As a majority of data processing nodes among the data processing nodes 102 are assumed to be genuine processing nodes, the centroid is expected to fall among the genuine data processing nodes.

It must be noted that the genuine data processing nodes are expected to have the learning parameter in similar direction to the centroid and thus have similarity values close to 1. On the contrary, the malicious data processing nodes are expected to have the learning parameter farther from the centroid and thus have similarity values closer to $-1$.

The similarity may be utilized to generate a trust score vector of each of the data processing nodes 102.

The containers SLC-1 106-1, SLC-2 106-2, SLC-3 106-3 may store the reference cryptographic hash value and the similarity in the distributed ledger 208, at instance 314. All computations may be performed in a decentralized manner by each of the data processing nodes 102 and results may be shared with all data processing nodes 102. Thus, the computational overhead may be distributed to all data processing nodes 102, without overloading one specific data processing node.

The containers SLC-1 106-1, SLC-2 106-2, SLC-3 106-3 may transmit a request for electing a leader node to the blockchain network 100, at instance 316. The leader node may be elected from the data processing nodes 102 by a leader election process, at instance 318. In one implementation, the distributed ledger 208 may comprise information related to rules associated with election of the leader node. Using such information, the leader node may be elected. For example, the first data processing node 102-1 may be elected as the leader node and other data processing nodes 102-2, 102-3 may be referred as peer nodes.

The SLC-1 106-1 may collect the similarity of each peer node and may perform clustering process, at instance 320. The SLC-1 106-1 may sort the data processing nodes 102 based on a cluster of similarity values and a trust score of each of the data processing node 102, at instance 322. The SLC-1 106-1 may compare a value of the similarity associated with each of the data processing nodes 102 with a threshold value, at instance 324. The threshold value may be a pre-determined baseline cryptographic hash value of genuine data processing nodes. In one implementation, the threshold value may be derived from previous learning of the ML models. The data processing nodes 102 having the value of the similarity greater than the threshold value may be selected for participating in merging process.

The SLC-1 106-1 may publish a list of data processing nodes selected for participating in the merging process, at instance 326. The list of data processing nodes selected for participating in the merging process may be stored in the distributed ledger 208. The SLC-1 106-1 may update the trust score of each of the data processing nodes 102 in the distributed ledger 208, at instance 328.

At instance 330, the SLC-1 106-1 may obtain the learning parameter from each peer node. For example, the SLC 106-1 may obtain the learning parameter_2 from the SLC-2 106-2 and the SLC 106-2 may obtain the learning parameter_3 from the SLC-3 106-3. At instance 332, the SLC-1 106-1 may determine a cryptographic hash value for each of the data processing nodes 102 based on the learning parameter. At instance 334, the SLC-1 106-1 may compare the cryptographic hash value with the reference cryptographic hash value of each of the data processing nodes 102. For example, the cryptographic hash value of each of the data processing nodes 102 may be compared with their reference cryptographic hash value to determine whether the cryptographic hash value is same as the reference cryptographic hash value or not. The SLC-1 106-1 may update the trust score of each data processing node 102 based on the comparison between the cryptographic hash value and the reference cryptographic reference value, at instance 336. For example, the trust score may be reduced when the cryptographic hash value is not same as the reference cryptographic hash value.

The SLC-1 106-1 may compute a weightage for each data processing node 102 based on the similarity and the trust score, at instance 338. For example, a weightage of a data processing node having high trust score may be retained and a weightage of a data processing node having low trust score may be reduced.

The weightage may be updated to dynamically reduce impact of a malicious data processing node on learning of the ML models. For example, the weightage of the malicious data processing node may be decreased in each iteration. The malicious data processing node may be excluded from learning performed by the distributed learning system when the weightage becomes less than a predefined threshold value. The process of learning the ML models may be continued after excluding the malicious data processing node.

The SLC-1 106-1 may merge the learning parameter received from each peer node to obtain a merged learning parameter, at instance 340. The learning parameter may be merged based on the weightage of the data processing nodes 102. The malicious data processing node having the weightage less than the predefined threshold value may be excluded in determination of the merged learning parameter. The SLC-1 106-1 may transmit a control signal indicating the merged learning parameter to the distributed ledger 208, at instance 342. The control signal may comprise identifier of the leader node and a flag bit indicating completion of merging of the learning parameters.

The SLC-2 106-2 and the SLC-3 106-3 may obtain the merged learning parameter from the SLC-1 106-1, at instance 344. The SLC-1 106-1 may indicate completion of training cycle to the distributed ledger 208, at instance 346. The SLC-1 106-1 may relinquish the leadership after completion of the training cycle, at instance 348. In next training cycle, a data processing node may be again elected as the leader node from the data processing nodes 102, and the learning process continues till an expected level of learning is achieved. In one implementation, the leader node may be elected on basis of the trust score. A data processing node having the trust score below the predefined threshold value may not be elected as a leader node.

Figure 4:
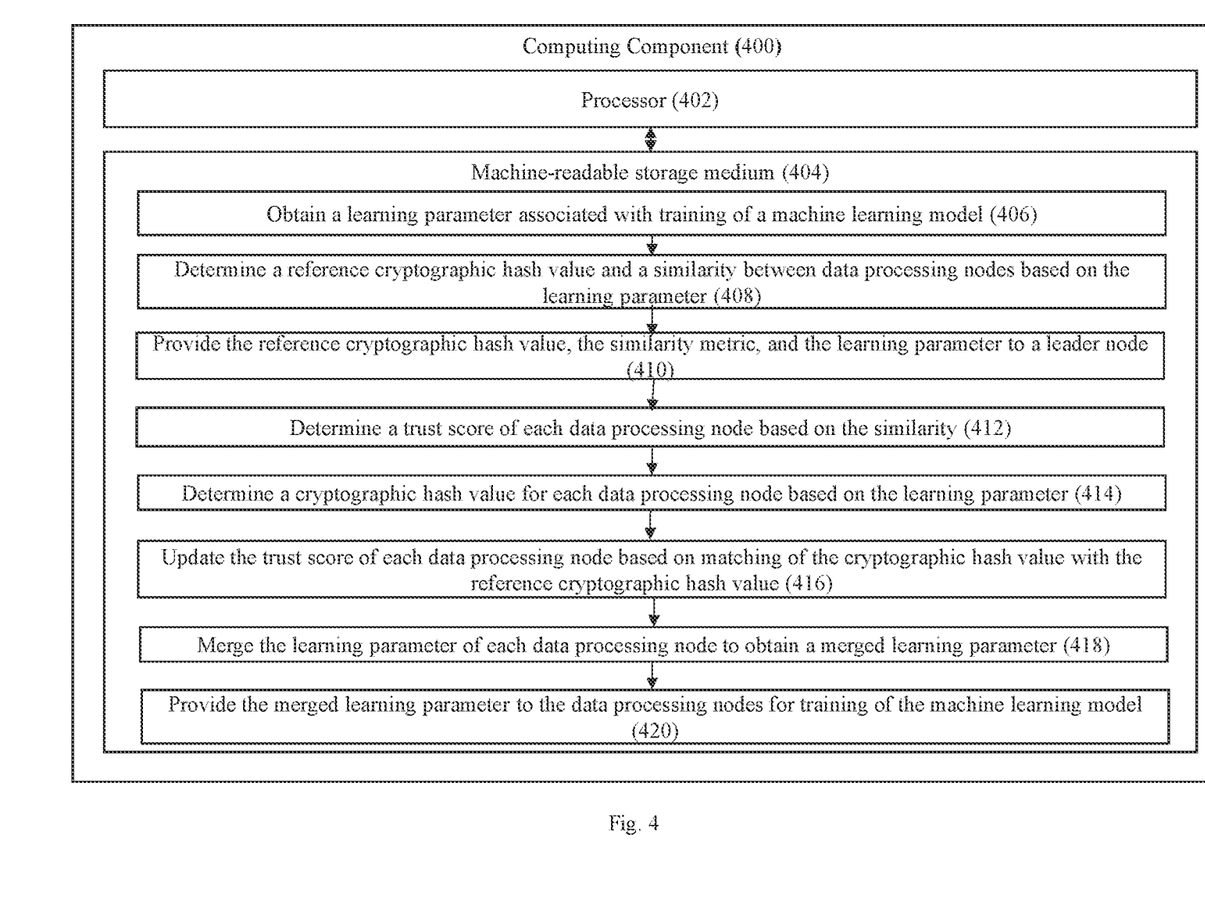
FIG. 4 illustrates a block diagram of a computing component utilized for detecting and defending decentralized ML models against an adversarial attack, in accordance with an embodiment of present disclosure.

FIG. 4 illustrates a block diagram of a computing component 400 utilized providing defense against adversarial attacks, in accordance with an embodiment of present disclosure. The computing component 400 may be, for example, a server computer, a controller, or any other similar computing component capable of processing data. In one embodiment, the computing component 400 may be a processor of the data processing node 102. The computing component 400 may include a processor 402 and a machine-readable storage medium 404.

The processor 402 may be one or more Central Processing Units (CPUs), semiconductor-based microprocessors, and/or other hardware devices suitable for retrieval and execution of instructions stored in the machine-readable storage medium 404. The processor 402 may fetch, decode, and execute instructions, such as instructions 406-422, to control processes or operations for merging training parameters in a blockchain network. As an alternative or in addition to retrieving and executing instructions, the processor 402 may include one or more electronic circuits, such as a Field Programmable Gate Array (FPGA), Application Specific Integrated Circuit (ASIC), or other electronic circuits that include electronic components for performing the functionality of one or more instructions.

The machine-readable storage medium 402, may be any electronic, magnetic, optical, or other physical storage device that contains or stores executable instructions. Thus, the machine-readable storage medium 402 may be, for example, Random Access Memory (RAM), Non-Volatile RAM (NVRAM), an Electrically Erasable Programmable Read-Only Memory (EEPROM), a storage device, an optical disc, and the like. In one embodiment, the machine-readable storage medium 404 may be a non-transitory storage medium, where the term "non-transitory" does not encompass transitory propagating signals. As described in detail below, the machine-readable storage medium 404 may be encoded with executable instructions, for example, instructions 406-422.

The processor 402 may execute the instructions 406 to obtain a learning parameter associated with training of ML models. The learning parameter may be obtained by each data processing unit enrolled with a decentralized blockchain network. The learning parameter may be utilized for training of the ML models associated with the decentralized blockchain network.

The processor 402 may execute the instructions 408 to determine a reference cryptographic hash value and a similarity between learnings of the plurality of machine learning models based on the learning parameter. The reference cryptographic hash value may refer an identity of corresponding data processing node. The similarity may be determined using cosine similarity values between gradients of top layers of the reference cryptographic hash value of each of the data processing nodes. A compressed cosine similarity may be obtained by performing dimensionality reduction on the cosine similarity values. Further, the similarity may be determined between a centroid of the gradients and each compressed similarity. A value of the similarity close to 1 indicates a genuine data processing node and a value of the similarity close to −1 indicates a malicious data processing node.

The processor 402 may execute the instructions 410 to provide the reference cryptographic hash value, the similarity, and the learning parameter to a leader node. The leader node may be one of the plurality of data processing nodes.

The processor 402 may execute the instructions 412 to determine a trust score of each of the plurality of data processing nodes based on the similarity. The trust score of a data processing node indicates its genuinity.

The processor 402 may execute the instructions 414 to determine a cryptographic hash value for each of the plurality of processing nodes based on the learning parameter. The cryptographic hash value may be calculated by the leader node.

The processor 402 may execute the instructions 416 to update the trust score of each of the plurality of data processing nodes based on matching of the cryptographic hash value with the reference cryptographic hash value. The trust score may be updated by the leader node. In one embodiment, the processor 402 may determine a weightage of each of the plurality of data processing nodes based on the trust score. The weightage of each of the plurality of data processing nodes may be updated in each iteration of learning of the ML models.

The processor 402 may execute the instructions 420 to merge the learning parameter of each of the plurality of data processing nodes to obtain a merged learning parameter. The learning parameter of each of the plurality of data processing nodes may be merged based on the weightage of each of the plurality of data processing nodes. For merging of the learning parameter, the similarity may be collected from the plurality of data processing nodes. The similarity may be utilized to cluster the data processing nodes to obtain a node cluster. Further, one or more malicious data processing nodes may be identified from the plurality of data processing nodes. The one or more malicious data processing nodes may be associated with a value of the similarity is lesser than a pre-defined baseline cryptographic hash value. The learning parameters obtained from the plurality of data processing nodes excluding the one or more malicious data processing nodes may be merged. The pre-defined baseline cryptographic hash value may be obtained from a cryptographic hash value of a merged learning parameter obtained from previous learning of the ML models. Details of each of the one or more malicious data processing nodes may be published on a distributed ledger.

The processor 402 may execute the instructions 422 to provide the merged learning parameter to the plurality of data processing nodes for training of the plurality of machine learning models. For example, the merged learning parameter may be published on the distributed ledger. The ML models may be trained on the merged learning parameter.

The present invention discloses a robust system for detecting and defending the decentralized ML system from adversarial attacks. The present invention provides a framework for detection of malicious data processing nodes in the decentralized ML system that evolves transparently with changing nature of malwares. A leader node utilized for merging the learning parameters is dynamically selected based on a node weightage in each iteration of learning. The node weightage of the leader node is updated in each iteration based on its trust score.

Further, the present invention works by adding modules or plugins into the internal state-machine logic to perform necessary actions. The modules and or plugins may provide flexibility to adaptively change the system with changing landscape of adversarial attacks. The system detects and isolates malicious nodes and continues federated learning process without interruptions. The present invention may find application in various fields ranging from hospitals to train ML models on sensitive patient information to an object detection ML model for self-driving vehicles acquiring sensor information from various vehicles, and/or in local training of other context-based models in between.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on detection and defending on a decentralized learning system, it is contemplated that control of other types of applications are applicable.

In the above description, for purposes of explanation, numerous specific details are set forth in order to provide a thorough understanding of the present systems and methods. It will be apparent the systems and methods may be practiced without these specific details. Reference in the specification to "an example" or similar language means that a particular feature, structure, or characteristic described in connection with that example is included as described, but may not be included in other examples.

As used in the present specification, the term "machine learning" refers broadly to an artificial intelligence technique in which a computer's behaviour evolves based on empirical data. In some cases, input empirical data may come from databases and yield patterns or predictions thought to be features of the mechanism that generated the data. Further, a major focus of machine learning is the design of algorithms that recognize complex patterns and makes intelligent decisions based on input data. Machine learning may incorporate a number of methods and techniques such as supervised learning, unsupervised learning, reinforcement learning, multivariate analysis, case-based reasoning, backpropagation, and transduction.

In some embodiments, a system and a method for training ML models may include a physical computer-readable medium bearing instructions for processing the ML models. The present disclosure maintains data privacy by processing data in a decentralized manner. The ML models trained on multiple edge nodes may be provided to a trainable parametric combinator to output a composite ML model.

In the above description and figures, some example and/or implementations of systems and methods for detection and defending of a decentralized learning system against an adversarial attack are described. As used herein, a cloud server may be employed to provide a service, such as data processing, data communication, data storage, or any other product or activity that may be capable of running on the cloud server, or a cloud-based service. As used herein, the cloud server may be any appropriate combination of physical and virtual resources pooled for computing and/or storage purposes. For example, the cloud server may include any appropriate number of individual resources, servers, and server groups including virtual instances of resources, servers, and server groups. The cloud server may include any appropriate number of clouds and/or other network of resources accessible by edge systems.

Implementations described hereinabove provide a system for ML model management, ML model deployment, ML model feedback collection, ML model re-training, etc. in support of applications executable on the edge systems. ML models may be selected and deployed based on characteristics shared between the edge system and other edge systems, and/or the cloud server. Information received from the edge system may be used to update/re-train instances of ML models, and the ML models may be tracked, documented, and stored such that ML models may be specifically managed and customized for a single edge system, a group of edge systems, etc. ML models are continuously or periodically monitored for accuracy, updated based on information, and deployed to various edge systems.

A computer network may be implemented using wired and/or wireless communication technologies. The computer network may comprise various network components such as switches, Provider Edge (PE) routers, Customer Edge (CE) routers, intermediate routers, bridges, computers, servers, and the like. The network devices present in the computer network may implement an Interior Gateway Protocol (IGP) including, but not limited to, Open Shortest Path First (OSPF), Routing Information Protocol (RIP), Intermediate System to Intermediate System (IS-IS), and Enhanced Interior Gateway Routing Protocol (EIGRP).

An interface may be used to provide input or fetch output from the system. The interface may be implemented as a Command Line Interface (CLI), Graphical User Interface (GUI). Further, Application Programming Interfaces (APIs) may also be used for remotely interacting with edge systems and cloud servers.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is no limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set as claimed in claims that issue from this application, in the specific form in which such claims issue, including any subsequent correction.

We claim:

1. A method comprising:
    obtaining, by each of a plurality of data processing nodes (102), a learning parameter associated with training of a plurality of machine learning models, wherein the plurality of data processing nodes (102) are enrolled with a decentralized blockchain network (100);
    determining, by each of the plurality of data processing nodes (102), a reference cryptographic hash value and a similarity between learnings of the plurality of machine learning models based on the learning parameter, wherein the reference cryptographic hash value refers to an identity of the corresponding data processing node;
    providing, by each of the plurality of data processing nodes (102), the reference cryptographic hash value, the similarity, and the learning parameter to a leader node (102-1), wherein the leader node (102-1) is one of the plurality of data processing nodes (102);
    determining, by the leader node (102-1), a trust score of each of the plurality of data processing nodes (102) based on the similarity, wherein the trust score of a data processing node indicates genuinity of the data processing node;
    determining, by the leader node (102-1), a cryptographic hash value for each of the plurality of data processing nodes (102) based on the learning parameter of each of the plurality of data processing nodes (102);
    updating, by the leader node (102-1), the trust score of each of the plurality of data processing nodes (102) based on matching of the cryptographic hash value with the reference cryptographic hash value;
    merging, by the leader node (102-1), the learning parameter of each of the plurality of data processing nodes (102) to obtain a merged learning parameter, wherein the learning parameter of each of the plurality of data processing nodes (102) are merged based on the trust score of each of the plurality of data processing nodes (102); and
    providing, by the leader node (102-1), the merged learning parameter to the plurality of data processing nodes (102) to be used for training the plurality of machine learning models.

2. The method as claimed in claim 1, further comprising:
    determining, by the leader node (102-1), a weightage of each of the plurality of data processing nodes (102) based on the trust score, wherein the learning parameter of each of the plurality of data processing nodes (102) are merged based on the weightage of each of the plurality of data processing nodes (102).

3. The method as claimed in claim 1, wherein the similarity is determined by:
    determining, by each of the plurality of data processing nodes (102), a cosine similarity value between gradients of top layers of the reference cryptographic hash value;
    performing, by each of the plurality of data processing nodes (102), dimensionality reduction on the cosine similarity values to obtain a compressed cosine similarity; and
    determining, by each of the plurality of data processing nodes (102), centroid of each compressed similarity, thereby determining the similarity.

4. The method as claimed in claim 3, wherein a value of the similarity close to 1 indicates a genuine data processing node and a value of the similarity close to −1 indicates a malicious data processing node.

5. The method as claimed in claim 1, further comprising:
    publishing, by the leader node (102-1), the merged learning parameter to a distributed ledger (208); and
    training, by each of the plurality of data processing nodes (102), the plurality of machine learning models based on the merged learning parameter.

6. The method as claimed in claim 1, wherein the merged learning parameter is obtained by:
  collecting, by the leader node (102-1), the similarity between the plurality of data processing nodes (102);
  clustering, by the leader node (102-1), the plurality of data processing nodes (102) to form a node cluster based on the similarity;
  identifying, by the leader node (102-1), one or more malicious data processing nodes from the plurality of data processing nodes (102), wherein the one or more malicious data processing nodes are associated with a value of similarity lesser than a pre-defined baseline cryptographic hash value; and
  merging, by the leader node (102-1), the learning parameter obtained from each of the plurality of data processing nodes (102) excluding the one or more malicious data processing nodes.

7. The method as claimed in claim 6, wherein the pre-defined baseline cryptographic hash value is obtained from a cryptographic hash value of a merged learning parameter obtained from previous learning of the plurality of machine learning models.

8. The method as claimed in claim 6, wherein details of each of the one or more malicious data processing nodes are published on a distributed ledger (208).

9. The method as claimed in claim 1, wherein a data processing node having the trust score below a predefined threshold value is excluded for election as the leader node.

10. A system comprising:
  a plurality of data processing nodes (102) enrolled in a decentralized blockchain network (100), wherein each of the plurality of data processing nodes (102) comprises a corresponding machine learning model of a plurality of machine learning models and is programmed to:
  obtain a learning parameter associated with training of the corresponding machine learning model, wherein the plurality of data processing nodes (102) are enrolled with a decentralized blockchain network (100);
  determine a reference cryptographic hash value and a similarity between learnings of the plurality of machine learning models based on the learning parameter, wherein the reference cryptographic hash value refers to an identity of the corresponding data processing node; and
  provide the reference cryptographic hash value, the similarity, and the learning parameter to a leader node (102-1) elected from the plurality of data processing nodes (102), wherein the leader node is configured to:
    determine a trust score of each of the plurality of data processing nodes (102) based on the similarity, wherein the trust score of a data processing node indicates genuinity of the data processing node;
    determine a cryptographic hash value for each of the plurality of processing nodes (102) based on the learning parameter of each of the plurality of data processing nodes (102);
    update the trust score of each of the plurality of data processing nodes (102) based on matching of the cryptographic hash value with the reference cryptographic hash value;
    merge the learning parameter of each of the plurality of data processing nodes (102) to obtain a merged learning parameter, wherein the learning parameter of each of the plurality of data processing nodes (102) is merged based on the trust score of each of the plurality of data processing nodes (102); and
    provide the merged learning parameter to the plurality of data processing nodes (102) to be used for training the corresponding machine learning models.

11. The system as claimed in claim 10, wherein the similarity is determined by:
  determining, by each of the plurality of data processing nodes (102), a cosine similarity value between gradients of top layers of the reference cryptographic hash value;
  performing, by each of the plurality of data processing nodes (102), dimensionality reduction on the cosine similarity values to obtain a compressed cosine similarity; and
  determining, by each of the plurality of data processing nodes (102), centroid of each compressed similarity, thereby determining the similarity.

12. The system as claimed in claim 11, wherein a value of the similarity close to 1 indicates a genuine data processing node and a value of the similarity close to −1 indicates a malicious data processing node.

13. The system as claimed in claim 10, wherein the leader node (102-1) is configured to publish the merged learning parameter to a distributed ledger (208), and each of the plurality of data processing nodes (102) is configured to train the plurality of machine learning models based on the merged learning parameter.

14. The system as claimed in claim 10, wherein the merged learning parameter is obtained by:
  collecting, by the leader node (102-1), the similarity between the plurality of data processing nodes (102);
  clustering, by the leader node (102-1), the plurality of data processing nodes (102) to form a node cluster based on the similarity;
  identifying, by the leader node (102-1), one or more malicious data processing nodes from the plurality of data processing nodes (102), wherein the one or more malicious data processing nodes are associated with a value of similarity lesser than a pre-defined baseline cryptographic hash value; and
  merging, by the leader node (102-1), the learning parameter obtained from each of the plurality of data processing nodes (102) excluding the one or more malicious data processing nodes.

15. The system as claimed in claim 10, wherein the pre-defined baseline cryptographic hash value is obtained from a cryptographic hash value of a merged learning parameter obtained from previous learning of the plurality of machine learning models.

16. The system as claimed in claim 10, wherein details of each of the one or more malicious data processing nodes are published on a distributed ledger (208).

17. The system as claimed in claim 10, wherein the learning parameter is obtained by a secured container of each of the plurality of data processing nodes (102) from a corresponding software container configured for training of the machine learning model.

18. The system as claimed in claim 17, wherein the secured container provides the merged learning parameter to the corresponding software container for training of the machine learning model locally.

19. The system as claimed in claim 10, wherein a data processing node having the trust score below a predefined threshold value is excluded for election as the leader node.

20. A non-transitory computer-readable medium storing a program including instructions that, when executed by a processor, causes a system to execute the method of claim 1.

* * * * *